(12) United States Patent
McDonough et al.

(10) Patent No.: US 9,581,218 B2
(45) Date of Patent: Feb. 28, 2017

(54) MULTI-STATE ELECTRONICALLY SWITCHABLE ENGINE MOUNT ASSEMBLY

(71) Applicants: William B. McDonough, Ortonville, MI (US); Jeff Bradshaw, Bloomfield, MI (US)

(72) Inventors: William B. McDonough, Ortonville, MI (US); Jeff Bradshaw, Bloomfield, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 0 days.

(21) Appl. No.: 14/587,884

(22) Filed: Dec. 31, 2014

(65) Prior Publication Data

US 2015/0377317 A1    Dec. 31, 2015

Related U.S. Application Data

(60) Provisional application No. 61/923,020, filed on Jan. 2, 2014.

(51) Int. Cl.
*F16F 5/00*     (2006.01)
*F16F 13/26*    (2006.01)
*B60K 5/12*     (2006.01)
*F16F 13/10*    (2006.01)

(52) U.S. Cl.
CPC ............ *F16F 13/26* (2013.01); *B60K 5/1283* (2013.01); *F16F 13/10* (2013.01)

(58) Field of Classification Search
CPC .......... F16F 13/26; F16F 13/10; F16F 13/266; F16F 7/1005; F16F 9/537; B60K 5/1283

USPC ......... 267/140.3–140.5, 140.13–140.15, 136
See application file for complete search history.

(56) References Cited

U.S. PATENT DOCUMENTS

| 4,783,062 | A  |   | 11/1988 | Hamberg et al. |              |
|-----------|----|---|---------|----------------|--------------|
| 5,620,168 | A  | * | 4/1997  | Ohtake         | F16F 13/26   |
|           |    |   |         |                | 267/140.13   |
| 5,639,073 | A  | * | 6/1997  | Suzuki         | F16F 13/26   |
|           |    |   |         |                | 267/140.13   |
| 6,199,842 | B1 | * | 3/2001  | Gennesseaux    | F16F 13/264  |
|           |    |   |         |                | 267/140.13   |
| 6,361,031 | B1 |   | 3/2002  | Shores et al.  |              |

(Continued)

OTHER PUBLICATIONS

PCT/US2014/073026 International Search Report and Written Opinion, Apr. 7, 2015.

*Primary Examiner* — Thomas J Williams
*Assistant Examiner* — Mahbubur Rashid
(74) *Attorney, Agent, or Firm* — Fay Sharpe LLP

(57) ABSTRACT

An engine mount assembly includes a housing, an inertia track received in the housing and an elongated fluid damped first path that is adapted to communicate with an associated first fluid chamber on a first side and an associated second fluid chamber on a second side. A non-damped second path is adapted to communicate with the associated first and second fluid chambers. A decoupler is received in the housing, an idle diaphragm in the housing that selectively controls communication between the first and second fluid chambers to selectively alter the damping. First and second ports in the housing communicate with the decoupler and the idle diaphragm, respectively. A first solenoid selectively controls fluid flow through the first port and a second solenoid selectively controls fluid flow through the second port.

20 Claims, 5 Drawing Sheets

(56) References Cited

U.S. PATENT DOCUMENTS

| | | | | |
|---|---|---|---|---|
| 6,592,111 | B2* | 7/2003 | Nishi | F16F 13/268 |
| | | | | 267/140.13 |
| 6,722,641 | B2* | 4/2004 | Yamada | F16F 13/268 |
| | | | | 267/140.14 |
| 8,998,187 | B2 | 4/2015 | Bradshaw et al. | |
| 2002/0066985 | A1* | 6/2002 | Muramatsu | F16F 13/26 |
| | | | | 267/140.5 |
| 2003/0098533 | A1* | 5/2003 | Nishi | F16F 13/262 |
| | | | | 267/140.11 |
| 2004/0070125 | A1* | 4/2004 | Nakagaki | F16F 13/26 |
| | | | | 267/140.14 |
| 2004/0150145 | A1* | 8/2004 | Tewani | F16F 13/264 |
| | | | | 267/140.14 |
| 2006/0006593 | A1* | 1/2006 | Bretaudeau | F16F 13/268 |
| | | | | 267/140.14 |
| 2010/0096789 | A1* | 4/2010 | Gannon | B60K 5/1266 |
| | | | | 267/140.15 |

\* cited by examiner

MULTI-STATE ELECTRONICALLY SWITCHABLE ENGINE MOUNT ASSEMBLY

This application claims priority from U.S. provisional patent application Ser. No. 61/923,020, filed 2 Jan. 2014, the disclosure of which is hereby expressly incorporated herein by reference.

BACKGROUND OF THE DISCLOSURE

This disclosure relates to a damper assembly and specifically a multi-stage switchable inertia track assembly.

Automotive engineers frequently use hydraulically damped elastomeric powertrain mounts to control shake and vibration responses resulting from various sources such as road inputs. This commonly comes in the form of a rubber isolator containing a hydraulic fluid cavity which acts as a pump when excited by vibration. The pumped fluid oscillates through a tube called an inertia track which creates a fluid resonance system and associated damping to dissipate the vibration energy and reduce the shake response. It is often desired to have a "bypass valve" designed into the fluid system to allow the pumped fluid to bypass the inertia track and flow directly into a low pressure reservoir under certain conditions, typically low amplitude vibrations, such as engine idle speed inputs, where isolation rather than damping is preferred to eliminate vibration. This bypass valve usually takes the form of a simple rubber disc or other flat shape, fitted between two perforated rigid forms, such as pierced metal plates, which is positioned to provide a short, direct route to the low pressure reservoir. Clearance between the thickness of the disc and the spacing of the perforated plates permits unimpeded flow between the pump chamber and low pressure reservoir for small vibration inputs, while effectively sealing the pathway and forcing the fluid to flow through the inertia track during high amplitude vibration. The disc or other shape that redirects fluid flow depending on the amplitude of the vibration input is referred to as the decoupler.

The basic technology for switchable hydraulic engine mounts has been known in the industry for several years, and commonly owned published applications WO2009105768A1 and WO2010/080630 show and describe representative engine mount assemblies. Physical switching of a hydraulic mount from a fluid damped state to a non-damped state by way of opening and closing a port is well understood. However, there are multiple methods by which this can be achieved.

Most vacuum actuated hardware is mounted externally for ease of manufacture. This external mounting tends to reduce the efficiency of the mount response. Most conventional designs use a diaphragm that encloses a volume and forms an air spring under the diaphragm and attached to an external port. Opening and closing this external port is the method used to "switch" the mount state, i.e., the stiffness or damping response. In the switch "open" state, air can be pumped to atmosphere from the volume. For example, the hydraulic engine mount has a low bearing spring stiffness with the open switch (the volume is open to atmosphere) and the engine mount damps or insulates idling vibrations (low amplitude, high frequency). In the switch "closed" state, the air in the volume acts as a stiff spring because the volume is closed or sealed and the damping fluid is transferred back and forth between a first or working fluid chamber and a second or compensating fluid chamber to damp high amplitude, low frequency vibrations. The air spring (closed volume) created by the closed port reduces the pressure of the fluid that would otherwise be pumped through the inertia track, as some of the fluid pressure is used to compress the air spring.

As with most switchable hydraulic engine mounts, this mount is intended to suspend the powertrain, provide damping to powertrain motion, control the powertrain travel, and isolate the powertrain from the vehicle chassis. The switch mechanisms in multi-state mounts allow the mount to switch among four states. Two of the states allow the fluid effect of the mount to be decoupled from compliance vibrations, and the other two states adjust the damping and frequency response of the mount.

A need exists for an improved switchable inertia track assembly, an associated method of packaging same, a design that functions in the same manner as a vacuum actuated multistate mount, but instead of vacuum, uses solenoids to switch the states, and also functions as a decoupled hydromount if there is an electronic failure.

SUMMARY OF THE DISCLOSURE

An engine mount assembly includes a housing, an inertia track received in the housing and an elongated fluid damped first path that is adapted to communicate with an associated first fluid chamber on a first side and an associated second fluid chamber on a second side, and a non-damped second path that is adapted to communicate with the associated first and second fluid chambers, a decoupler received in the housing, an idle diaphragm in the housing that selectively controls communication between the first and second fluid chambers to selectively alter the damping, and first and second ports in the housing that communicate with the decoupler and the idle diaphragm, respectively. A first solenoid selectively controls fluid flow through the first port and a second solenoid selectively controls fluid flow through the second port.

The first solenoid is larger than the second solenoid.

In the absence of electrical power, the assembly operates as a decoupled hydromount.

The first solenoid is an idle fluid port and the second solenoid is a decoupler air port.

The first port is normally closed and the second port is normally open.

The diaphragm includes a first opening therethrough.

The first opening is aligned with the second solenoid.

The inertia track includes an elongated air port member extending through the first opening in the diaphragm that communicates with the decoupler.

A diaphragm cover interposed between the diaphragm and the first and second solenoids.

The diaphragm cover includes a support that receives a terminal end of the elongated air port member for aligning the terminal end with the second solenoid.

A moveable valve controls flow through the idle port in the inertia track.

A biasing spring urges the valve to a normally closed position with the idle port.

A method of manufacturing a multistage switchable inertia track assembly includes providing a housing, positioning an inertia track in the housing that has an elongated fluid damped first path that is adapted to communicate with an associated first fluid chamber on a first side and an associated second fluid chamber on a second side, and a non-damped second path that is adapted to communicate with the associated first and second fluid chambers, providing a decoupler in the housing to selectively close at least one of the first and second paths, supplying a diaphragm in the housing to selectively control communication between the first and second fluid chambers and to selectively alter the damping state, providing first and second ports in the housing to communicate with the decoupler and the idle diaphragm, respectively, and providing first and second solenoids that control fluid flow through the first and second ports, respectively.

Still other features and benefits will be found in the following detailed description.

DETAILED DESCRIPTION OF THE PREFERRED EMBODIMENT

Figure 1:
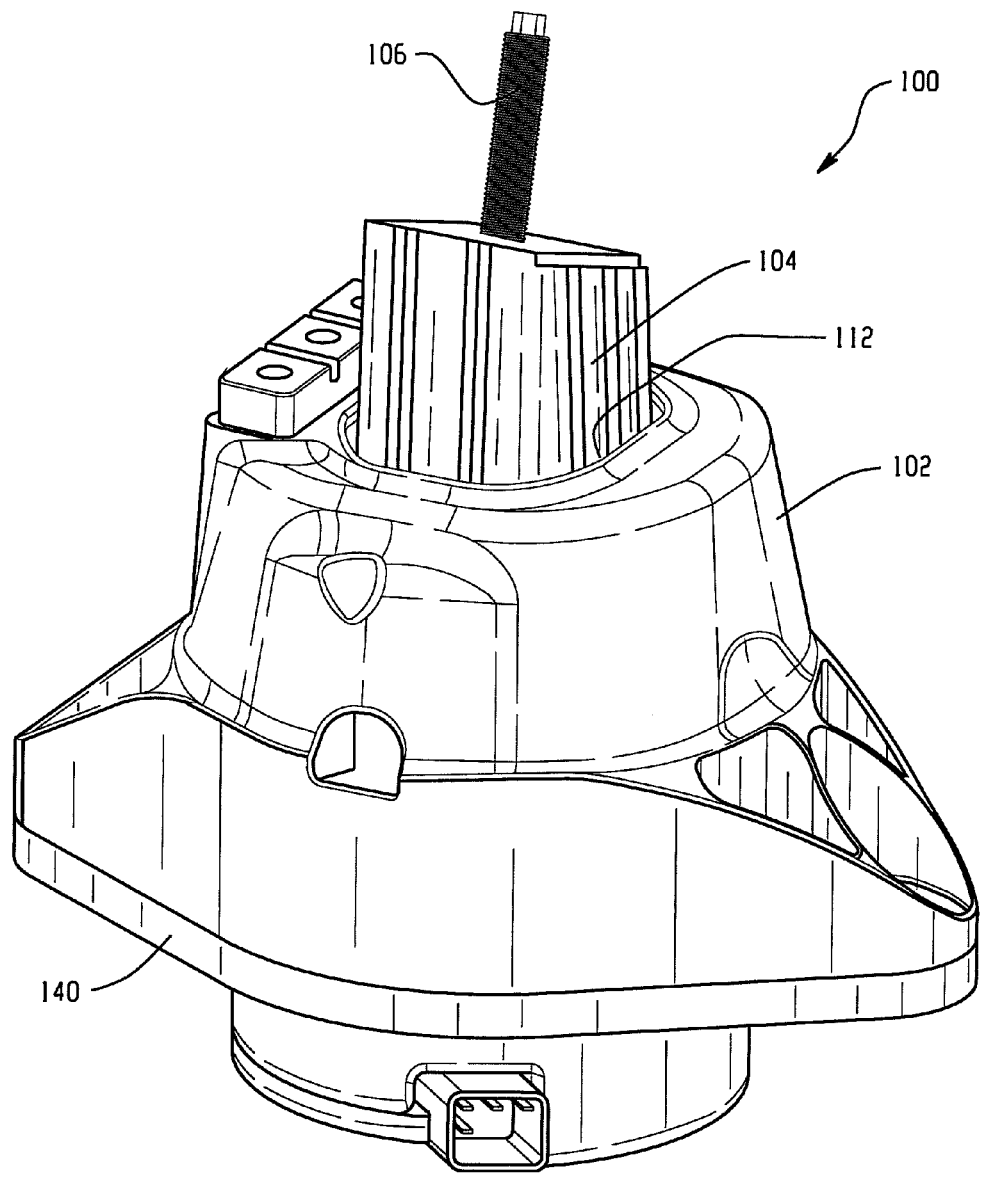
FIG. 1 is a perspective view of an assembled hydraulic engine mount or hydromount.
Figure 2:
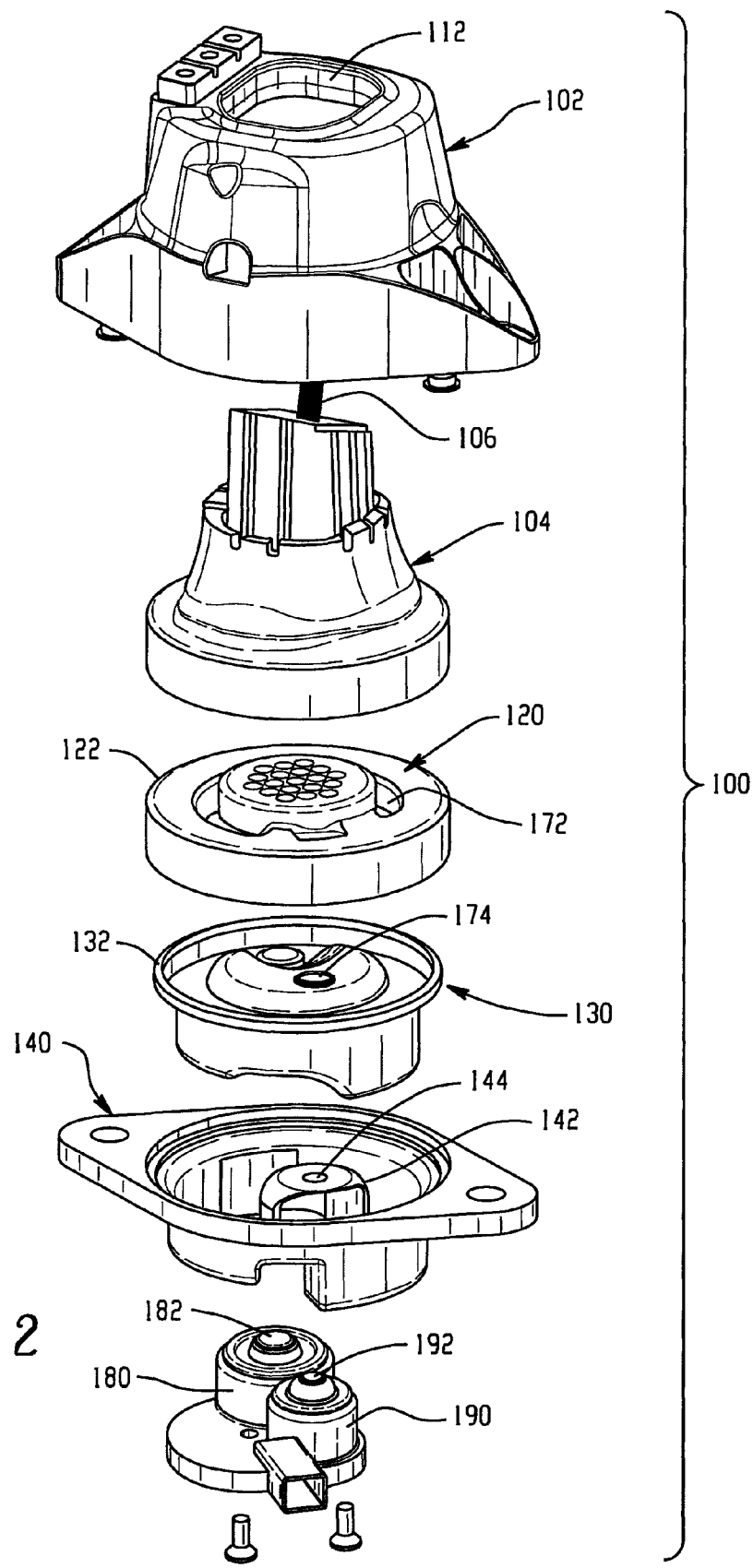
FIG. 2 is an exploded view of various components of the mount assembly of FIG. 1.
Figure 3:
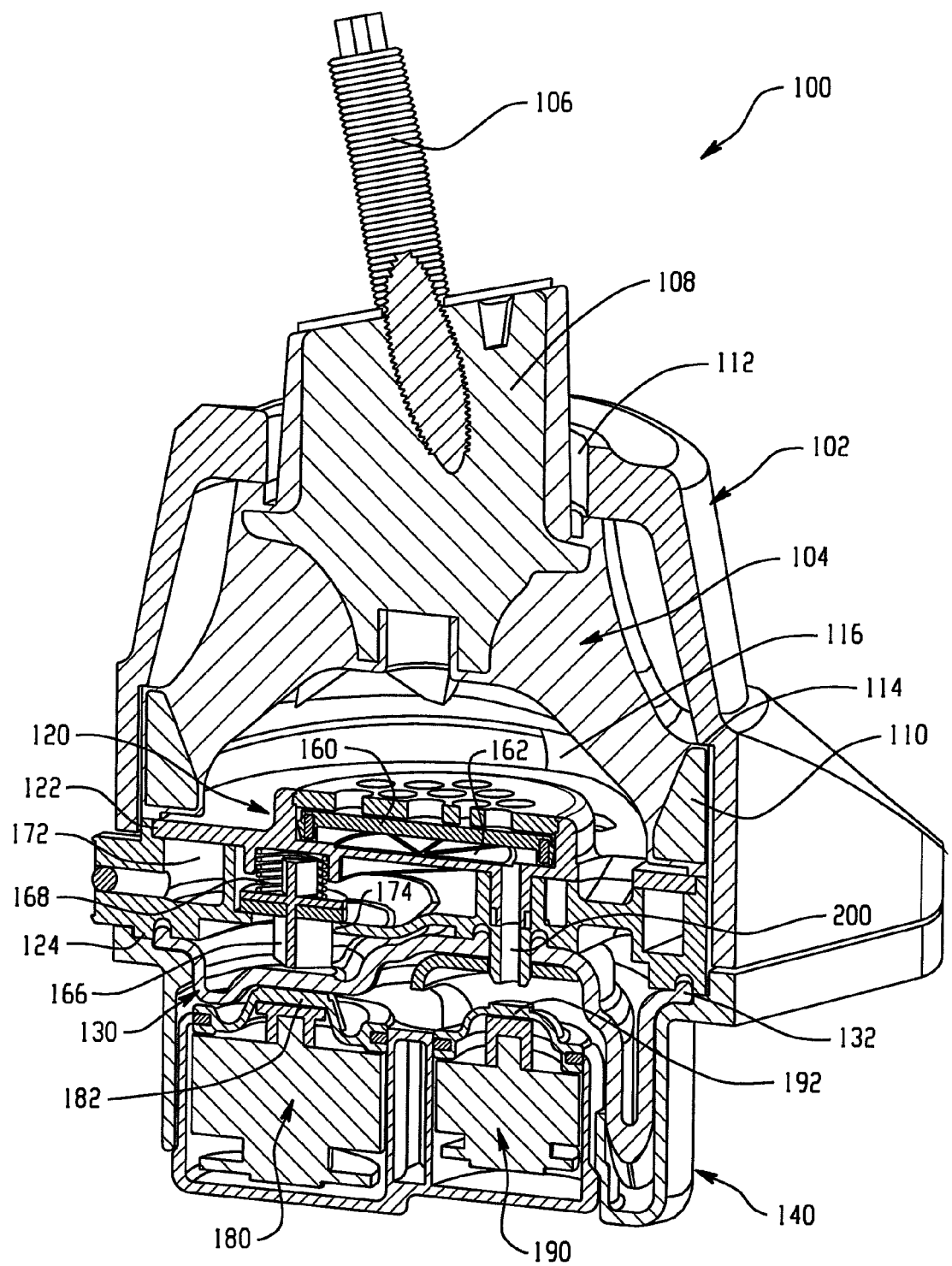
FIG. 3 is a longitudinal cross-sectional view of the assembled mount of FIGS. 1 and 2.

Turning first to FIGS. 1-3, there is shown an engine mount or hydro-mount assembly 100. More particularly, the mount assembly 100 includes a restrictor or external housing 102 dimensioned to receive a first or elastomeric component or main rubber element 104 that is generally shaped as a truncated cone, and primarily made of an elastomeric material, such as an elastic rubber as is conventional in the art. A fastener or bolt 106 extends outwardly from the main rubber element 104 for fastening to a power train or engine (not shown) in a manner generally known in the art. The fastener 106 cooperates with a metal bearing member 108 (FIG. 3) that has at least a portion encapsulated within the first elastomeric member 104. In addition, a lower peripheral portion of the main rubber element 104 may include a stiffener, such as metallic stiffener 110, molded within the main rubber element to add rigidity and support.

The main rubber element 104 is received within the restrictor housing 102 so that the fastener 106 extends through a central opening 112 in the restrictor. An internal shoulder 114 (FIG. 3) of the restrictor 102 abuttingly engages the reinforced, lower portion of the main rubber element 104. In addition, the lower portion of the main rubber element 104 forms a portion of a first or upper fluid chamber 116, namely a high pressure side, of the engine mount 100. The remainder of the first fluid chamber 116 is defined by an inertia track assembly 120, more specific details of which will be described below. An outer radial portion of an upper surface of the inertia track assembly denoted by reference numeral 122 abuttingly and sealingly engages the main rubber element 104 in order to seal the first fluid chamber 116. As particularly evident in FIG. 3, at least a portion of the inertia track assembly 120 is received within the restrictor housing 102. A second, outer radial portion along the lower surface denoted by reference numeral 124 is sealingly engaged by a rubber boot or diaphragm 130, and particularly an upper peripheral portion 132 thereof. The diaphragm 130 includes an opening 134 therethrough for reasons to be described further below. The diaphragm 130 is protected by a diaphragm cover 140, preferably formed of a more rigid material than the elastomeric diaphragm, and that matingly engages the restrictor housing 102. When the diaphragm cover 140 is fastened to the restrictor 102, the lower peripheral edge of the main rubber element 104 and the peripheral portion 132 of the diaphragm sealingly engage opposite sides or faces 122, 124, respectively, of the inertia track assembly 120.

As vibrations or displacements are received into the mount from the powertrain, fluid is pumped from the first fluid chamber 116 through the inertia track assembly 120 in different ways. Particularly, and with continued reference to FIGS. 1-3, and additional reference to FIG. 4, the inertia track assembly 120 is disposed between the first or upper fluid chamber 116 and the second or lower fluid chamber 150. Thus, the upper side of the inertia track assembly 120 is associated with the high pressure side of the mount. On the other hand, the lower surface of the inertia track assembly 120 is associated with the second or lower fluid chamber 150 and is sometimes referred to as the low pressure side of the mount. The fluid is pumped from the top to the bottom through the inertia track assembly 120. The fluid response of the inertia track assembly 120 depends on a decoupler 160 and the diaphragm 130.

As noted above, the diaphragm 130 is sealed about its perimeter to an underside of the inertia track assembly 120, thus forming the second or lower chamber 150 of the engine mount. Fluid between the first chamber 116 and the second chamber 150 either passes through an elongated serpentine path 172 or through a more direct, bypass or idle port passage 174.

Figure 4:
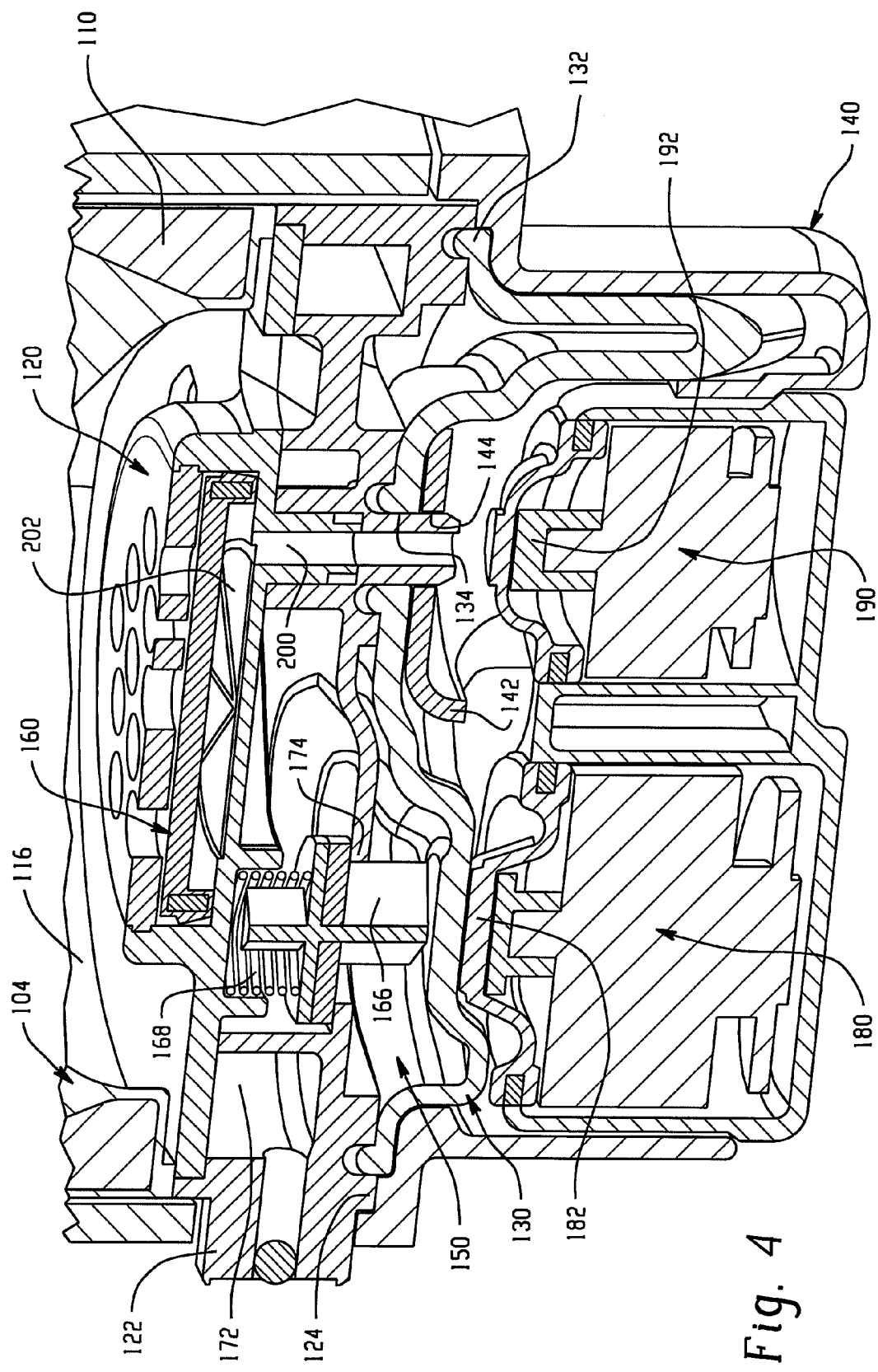
FIG. 4 is an enlarged view of the lower portion of FIG. 3.
Figure 5:
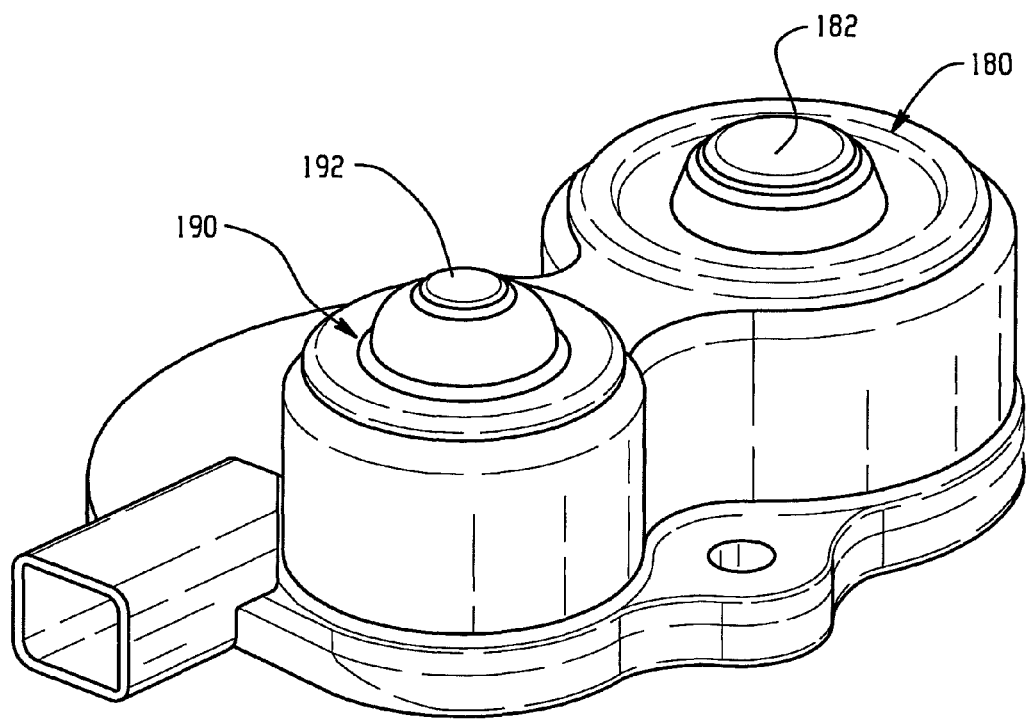
FIGS. 5 and 6 are perspective views of the solenoid assembly used in the switchable engine mount.
Figure 6:
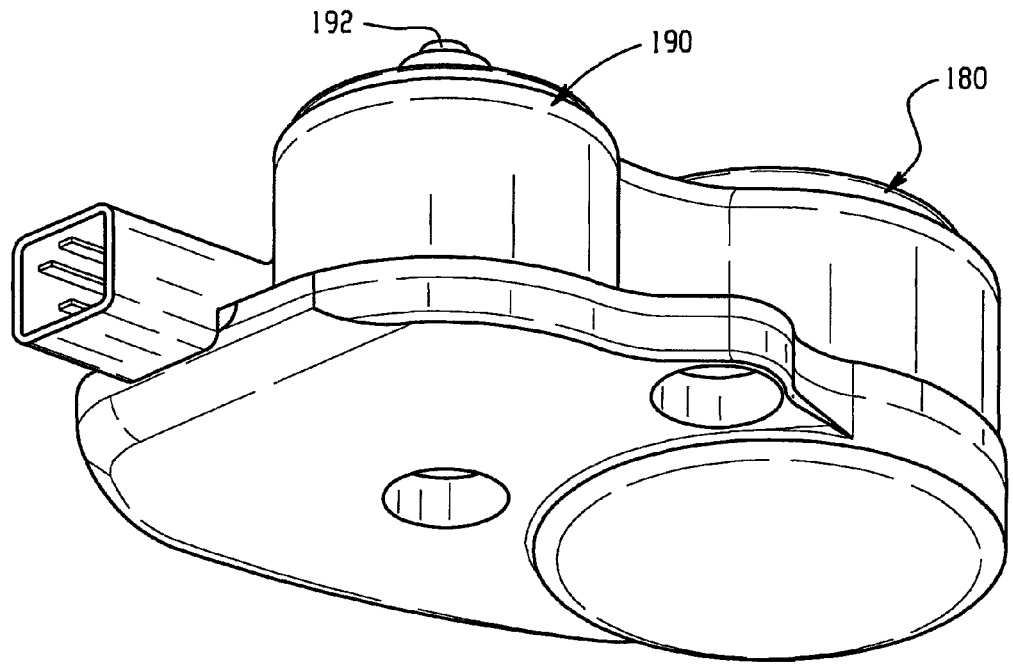

A shown in FIGS. 3 and 4, the passage 174 is closed by a first or an idle port valve 166. The idle port valve 166 is normally closed as a result of the biasing force imposed by spring 168 that urges the idle port valve toward a closed position (downwardly as illustrated in the figures). As a result, fluid communicates between the first and second chambers 116, 150 via the elongated serpentine path 172. Fluid is sent through this elongated path 172 in the inertia track 120 to damp the vibration energy (e.g., non-idle, high amplitude vibrations).

A first solenoid 180 is mounted so that when the solenoid is energized, a stem/plate 182 is extended (upwardly as shown) and pushes on an underside of the diaphragm 130 which, in turn, pushes upwardly on the idle port valve 166 to overcome the downward biasing force of the spring 168. This energized solenoid action opens the idle port valve 166 and thus the passage 174 is open to allow communication between the first chamber 116 and the second chamber 150. Typically, the first solenoid 180 is only active during the idle state, and by pushing upwardly on the idle valve 166 to allow fluid flow through the idle port passage 164, a desired idle rate dip is created. When the first solenoid 180 is deenergized, the passage 174 is closed.

A second solenoid 190 controls flow through a second port or passage 200, which is also referred to as a decoupler air port. A stem/seal member 192 extends into sealing engagement with the decoupler air port 200 when the second solenoid 190 is energized. By sealing the second port 200, air beneath the decoupler 160 no longer exhausts to ambient or atmosphere. Noticeably, the passage 200 extends from a cavity 202 beneath the decoupler 160 (FIG. 4), downwardly through the remainder of the inertia track assembly 120 where the passage passes through the corresponding opening 134 in the diaphragm 130. A support member 142 extends upwardly from the protective cover member 140 and overlies the second solenoid 190. The support member 142 includes an opening 144 in an upper portion thereof that is aligned with the opening 134 in the diaphragm 130, and also receives a portion of the decoupler air port 200. The support member 142, and particularly the aligned openings 134, 144 in the diaphragm and support member, respectively, properly position a terminal end of the decoupler airport passage 200 for selective engagement with the seal member 192 of the second solenoid 190. When energized, the second solenoid 190 urges the seal member 192 to seal the decoupler air port 200, thereby trapping air in cavity 202 beneath the decoupler 160. This stops movement of the decoupler 160. Preferably, the second solenoid 190 is also active in the idle state.

As is also evident in the Figures, the first solenoid 180 is larger than the second solenoid 190. The second solenoid 190 requires considerably less power than the first or idle solenoid 180 and thus the reason for its reduced, relative size.

Another advantageous feature of the multi-state electrical mount shown and described above is that in the absence of electronic failure, both the first and second solenoids 180, 190 are retracted and as a consequence, the idle port passage 174 is closed by the idle port valve 166 and the decoupler air port 200 is open so that the cavity 202 beneath the decoupler 160 communicates with ambient. This allows the assembly to operate as a decoupled hydromount.

Attached Exhibit 1 provides further structural and performance details of the present disclosure.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

We claim:

1. A multistate electronically switchable engine mount assembly comprising:
   a housing;
   an inertia track received in the housing and having an elongated fluid damped first path that is adapted to communicate with an associated first fluid chamber on a first side and an associated second fluid chamber on a second side, and a non-damped second path, different than the first path, that is adapted to communicate with the associated first and second fluid chambers;
   a decoupler;
   an idle diaphragm in the housing that selectively controls communication between the first and second fluid chambers to selectively alter the damping;
   first (idle) and second (decoupler) ports in the housing that communicate with the decoupler and the idle diaphragm, respectively;
   a first solenoid that selectively controls fluid flow through the first port; and
   a second solenoid that selectively controls fluid flow through the second port, and wherein the first solenoid is larger than the second solenoid.

2. The assembly of claim 1 wherein in the absence of electrical power, the assembly is a decoupled hydromount.

3. The assembly of claim 2 wherein the first port is normally closed and the second port is normally open.

4. The assembly of claim 2 wherein the first solenoid is an idle fluid port.

5. The assembly of claim 4 wherein the second solenoid is a decoupler air port.

6. The assembly of claim 1 further comprising a moveable valve that controls flow through an idle port in the inertia track.

7. The assembly of claim 6 further comprising a biasing spring urging the valve to a normally closed position with the idle port.

8. The assembly of claim 1 wherein the diaphragm includes a first opening therethrough.

9. The assembly of claim 8 wherein the first opening is aligned with the second solenoid.

10. The assembly of claim 9 wherein the inertia track includes an elongated air port member extending through the first opening in the diaphragm that communicates with the decoupler.

11. The assembly of claim 10 further comprising a diaphragm cover interposed between the diaphragm and the first and second solenoids.

12. The assembly of claim 11 wherein the diaphragm cover includes a support that receives a terminal end of the elongated air port member for aligning the terminal end with the second solenoid.

13. A multistate electronically switchable engine mount assembly comprising:
    a housing;
    an inertia track received in the housing and having an elongated fluid damped first path that is adapted to communicate with an associated first fluid chamber on a first side and an associated second fluid chamber on a second side, and a non-damped second path that is adapted to communicate with the associated first and second fluid chambers;
    a decoupler;
    an idle diaphragm in the housing that selectively controls communication between the first and second fluid chambers to selectively alter the damping, wherein the diaphragm includes a first opening therethrough;
    first (idle) and second (decoupler) ports in the housing that communicate with the decoupler and the idle diaphragm, respectively;
    a first solenoid that selectively controls fluid flow through the first port; and
    a second solenoid that selectively controls fluid flow through the second port.

14. The assembly of claim 13 wherein the first opening is aligned with the second solenoid.

15. The assembly of claim 14 wherein the inertia track includes an elongated air port member extending through the first opening in the diaphragm that communicates with the decoupler.

16. The assembly of claim 15 further comprising a diaphragm cover interposed between the diaphragm and the first and second solenoids.

17. The assembly of claim 16 wherein the diaphragm cover includes a support that receives a terminal end of the elongated air port member for aligning the terminal end with the second solenoid.

18. A method of making an engine mount comprising:
    providing a housing;
    positioning an inertia track in the housing that has an elongated fluid damped first path that is adapted to communicate with an associated first fluid chamber on a first side and an associated second fluid chamber on a second side, and a non-damped second path that is adapted to communicate with the associated first and second fluid chambers;

providing a decoupler in the housing to selectively close at least one of the first and second paths;

supplying a diaphragm in the housing to selectively control communication between the first and second fluid chambers and to selectively alter the damping state;

providing first and second ports in the housing to communicate with the decoupler and the idle diaphragm, respectively;

providing first and second solenoids that control fluid flow through the first and second ports, respectively; and making the first solenoid larger than the second solenoid.

19. The method of claim 18 wherein the first port includes providing an idle fluid port that is normally closed.

20. The method of claim 19 wherein the second port includes providing a decoupler air port that is normally open.

* * * * *